United States Patent
Sikes

[19]

[11] Patent Number: 6,143,341
[45] Date of Patent: Nov. 7, 2000

[54] CONVECTION BASED COOKING METHOD WITH FLOW OF COMBINED HEATED AIR AND STEAM

[76] Inventor: Jimmy A. Sikes, P.O. Box 443, Vidalia, Ga. 30475

[21] Appl. No.: 09/329,690

[22] Filed: Jun. 10, 1999

Related U.S. Application Data

[62] Division of application No. 09/083,416, May 22, 1998, Pat. No. 6,038,964.
[60] Provisional application No. 60/061,042, Sep. 26, 1997.

[51] Int. Cl.[7] ..................................................... A23L 1/00
[52] U.S. Cl. ...................... 426/510; 126/369.1; 426/523
[58] Field of Search .................................. 426/510, 511, 426/520, 523, 506; 126/369.1; 99/340, 355, 417, 447, 450, 473, 482

[56] References Cited

U.S. PATENT DOCUMENTS

| | | | |
|---|---|---|---|
| 753,143 | 2/1904 | Kimmons | 99/482 X |
| 1,045,643 | 11/1912 | Tucker | 99/482 X |
| 3,561,348 | 2/1971 | Weir, Sr. | 99/446 X |
| 3,568,590 | 3/1971 | Grice | 99/446 |
| 4,062,983 | 12/1977 | Roderick | 426/418 |
| 4,064,796 | 12/1977 | Jones | 99/330 |
| 4,189,995 | 2/1980 | Lohr et al. | 99/447 |
| 4,202,259 | 5/1980 | Johansson | 99/352 |
| 4,244,979 | 1/1981 | Roderick | 426/418 |
| 4,348,948 | 9/1982 | Allison | 99/339 |
| 4,469,020 | 9/1984 | Hamilton et al. | 99/352 |
| 4,510,854 | 4/1985 | Robertson | 99/337 |
| 4,928,663 | 5/1990 | Nevin et al. | 126/21 |
| 4,934,260 | 6/1990 | Blevins | 99/476 X |
| 5,318,792 | 6/1994 | Tippmann | 426/510 |
| 5,331,886 | 7/1994 | Basel | 99/446 |
| 5,533,444 | 7/1996 | Parks | 99/476 |
| 5,631,033 | 5/1997 | Kolvites | 426/510 |

Primary Examiner—George C. Yeung

[57] ABSTRACT

A convection based cooking apparatus with an insulating baffle to provide improved air-flow and isolation between a cooking chamber and a heating chamber. The heating chamber and the cooking chamber are positioned side by side, and separated by the insulating baffle. The insulating baffle is hollow for holding a liquid and includes an opening for emitting steam. An air passage exists between the heating chamber and the cooking chamber, in such a way that, heated air passes through the passage, flows over the insulating baffle to combine with the steam, and then into the cooking chamber. The air passage is located near the top of the heating chamber and the cooking chamber. As the air passes over the insulating baffle, the air is diffused throughout the cooking chamber and thereby uniformly distributed across a cooking surface within the cooking chamber.

2 Claims, 3 Drawing Sheets

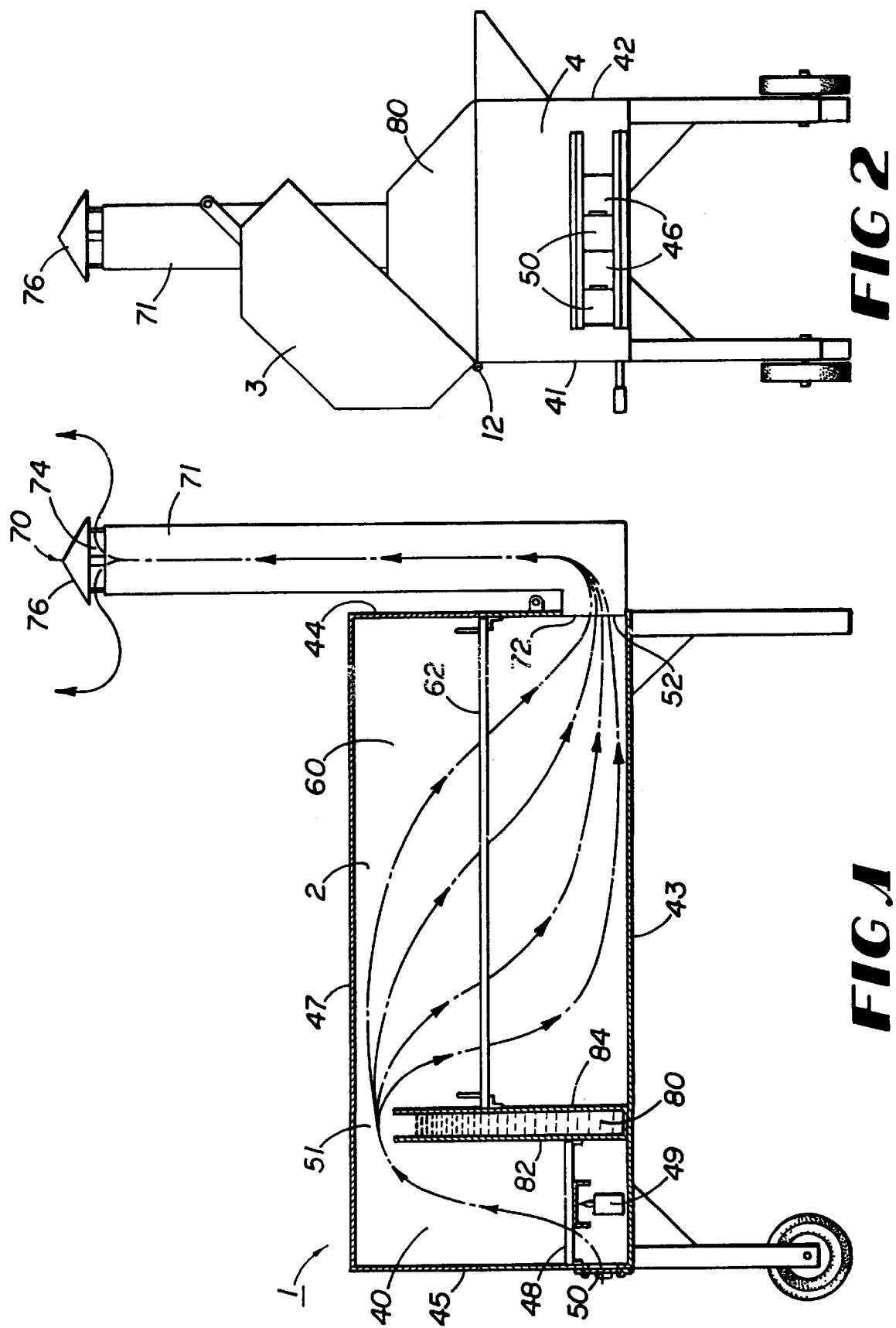

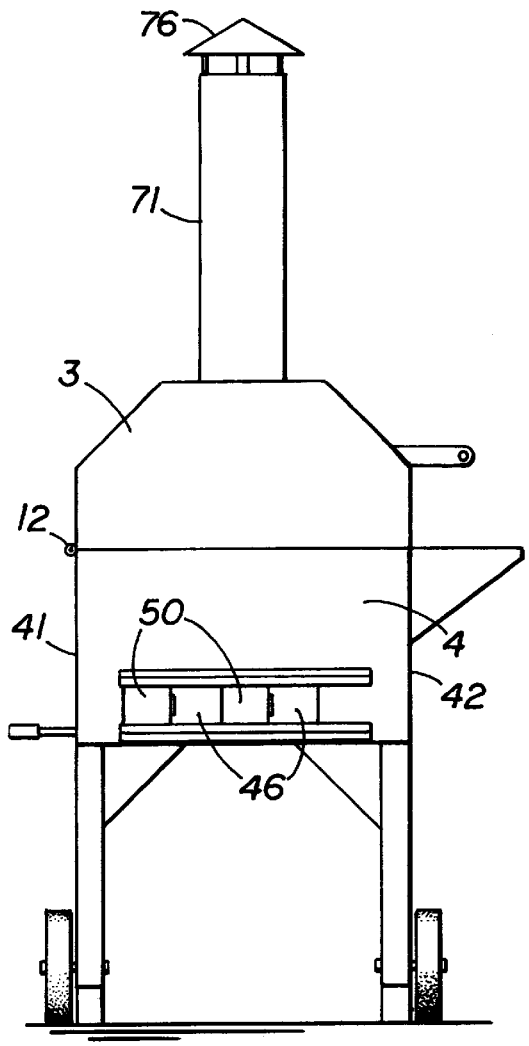
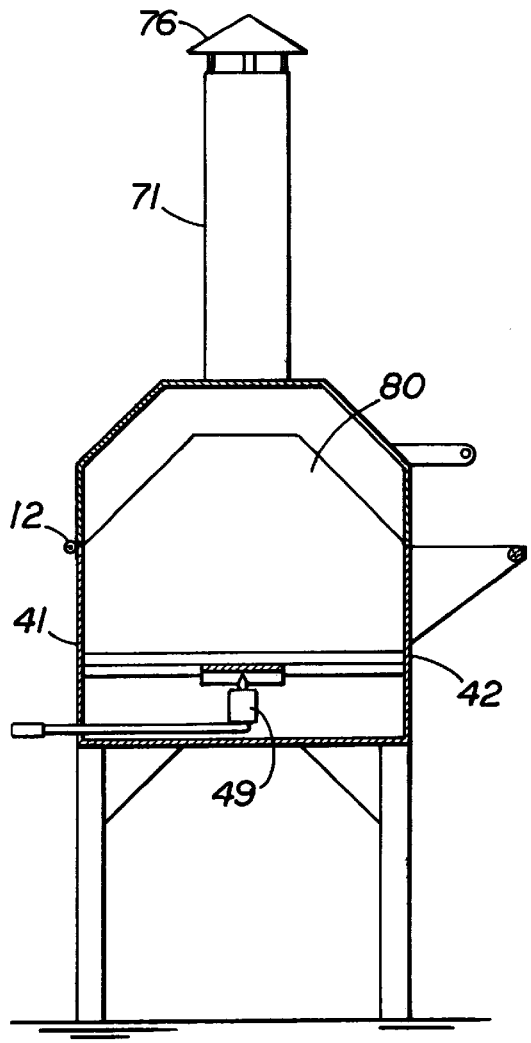
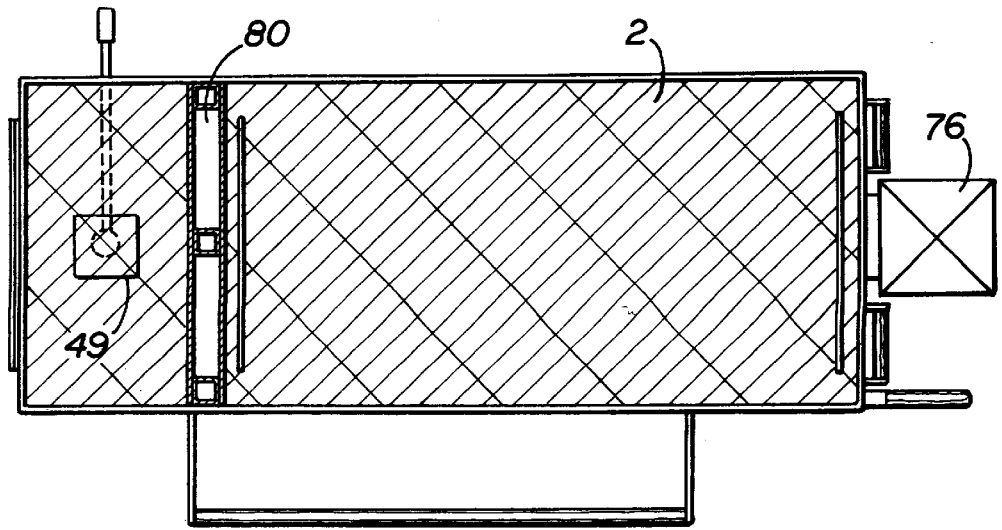

CONVECTION BASED COOKING METHOD WITH FLOW OF COMBINED HEATED AIR AND STEAM

CROSS-REFERENCE TO RELATED APPLICATION

This application is a division of U.S. application Ser. No. 09/083,416, filed May 22, 1998, now U.S. Pat. No. 6,038, 964, which claims the benefit of U.S. Provisional Application Ser. No. 60/061,042, filed Sep. 26, 1997.

TECHNICAL FIELD

The present invention relates to convection ovens, grills, and similar cooking apparatus and, more specifically, to a convection based cooking apparatus with improved air-flow and heat distribution.

BACKGROUND OF THE INVENTION

Convection ovens, convection heaters, hot air balloons, etc. operate on the principle that the density of air and the temperature of air are inversely proportional to each other. In more familiar words, hot air rises. Within the context of convection ovens, grills or cookers, this principle is used for cooking items without having to expose the items directly to a flame or heating element.

In state of the art convection ovens, grills, or cookers, a heating element is usually positioned to the side and below a cooking surface. As air is heated by the heating element, the heated air is drawn up through the cooking surface. Problems that exist in these known convection ovens include the inability to uniformly distribute the heated air over the cooking surface and the inability to uniformly distribute the heat. These problems result in varying cooking rates for items located at different positions on the cooking surface. The lack of uniform distribution of the heated air, among other reasons, can be attributed to poorly designed air-flow through the convection oven. The lack of uniform heat distribution, among other reasons, can be attributed to a failure to insulate the cooking surface from the heating element. As a result, items on the cooking surface that are located in close proximity to the opening to the heating element cook at a higher rate than items located further from the opening.

Therefore, there is a need in the art for a convection oven that provides a more uniform distribution of heated air over the cooking surface. In addition, there is a need in the art for a convection oven that provides insulation between the cooking surface and the heating element.

SUMMARY OF THE INVENTION

The present invention solves the above-identified problems in the art by providing a method and apparatus for insulating a cooking surface from a heating element and uniformly passing heated air over the cooking surface. The cooking apparatus of the present invention comprises a heating chamber and a cooking chamber separated by an insulating baffle.

In an exemplary embodiment, the heating chamber and the cooking chamber are positioned side by side, separated by the insulating baffle. The insulating baffle is hollow for holding a liquid and includes an opening in the top for emitting steam. An air passage exists between the heating chamber and the cooking chamber to allow heated air to pass through the passage, flow over the insulating baffle to combine with the steam, and then flow into the cooking chamber. In the exemplary embodiment, the air passage is located near the top of the heating chamber and the cooking chamber. As the air passes over the insulating baffle, the air is diffused throughout the cooking chamber and thereby uniformly distributed across a cooking surface within the cooking chamber.

In an alternate embodiment, the insulating baffle is detachable. In yet another embodiment, the cooking chamber is stacked on top of the heating chamber.

Accordingly, it is an object of the present invention to provide an improved convection oven. It is another object of this invention to provide a convection oven that provides insulation between the cooking surface and the heating element.

It is a further object of the present invention to provide a more uniform distribution of heated air over the cooking surface.

It is a further object of the present invention to provide an insulating baffle and reservoir within a convection oven to insulate the cooking surface and the heating element, and to interject steam into the air-flow of the convention oven.

Other objects, features and advantages of the present invention will become apparent upon review of the following detailed description of the embodiment of the present invention when taken in conjunction with the drawings and appended claims.

BRIEF DESCRIPTION OF THE DRAWINGS

FIG. 1 is a cross-section view illustrating the convection flow of an exemplary embodiment of the present invention.

FIGS. 2 and 3 illustrate end views of the embodiment of FIG. 1, with the upper section respectively raised and lowered.

FIG. 4 is a cross-section side-view of the cabinet interior of the embodiment of FIG. 1.

FIG. 5 is a cross-section top-view of the cabinet interior of the embodiment of FIG. 1.

DETAILED DESCRIPTION OF PREFERRED EMBODIMENTS

Figure 6:
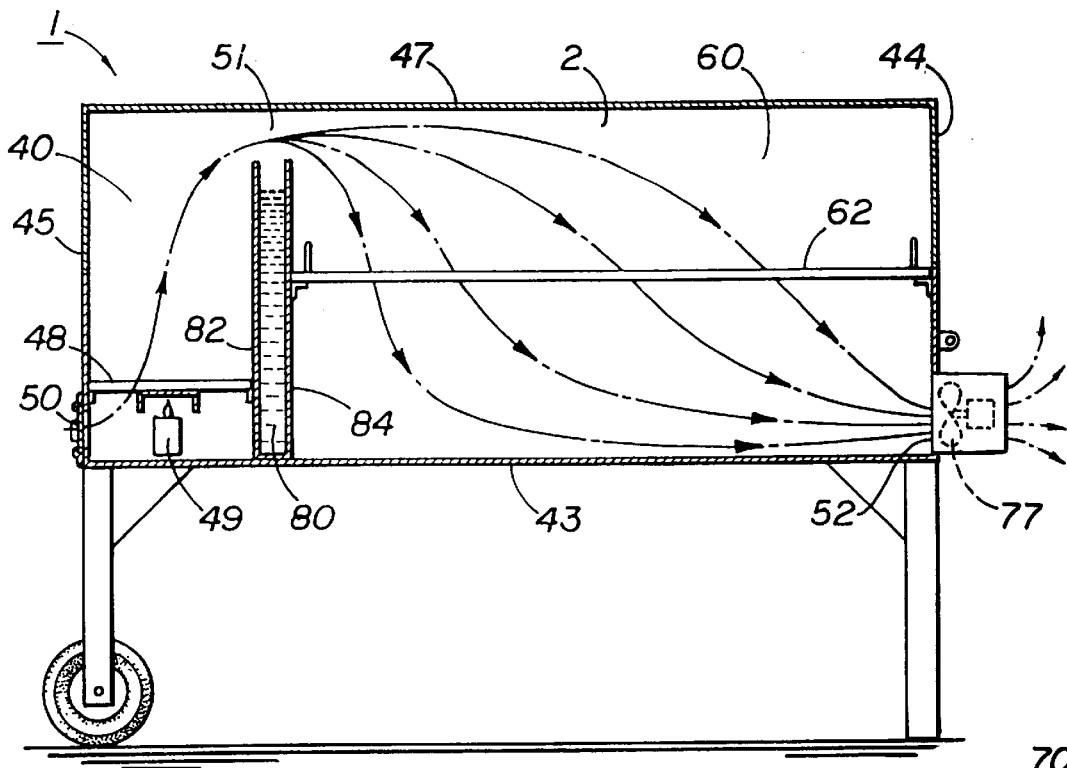
FIG. 6 is a cross-section view of an alternate embodiment of the present invention.

The present invention is directed towards providing a convection based cooking apparatus. One aspect of the present invention includes providing an insulating baffle between a cooking element and the cooking surface of the cooking apparatus. Another aspect of the present invention is providing a substantially uniform distribution of heated air across the cooking surface of the cooking apparatus. Another aspect of the present invention is providing a reservoir that can be used to add seasoning to items cooked within the cooking apparatus. Another aspect of the present invention is providing horizontally adjacent heating and cooking chambers separated by a baffle to prevent over cooking of items in the cooking chamber.

FIGS. 1–5 illustrate various views of a preferred embodiment of the present invention. FIG. 1 is a cross-section view illustrating the convection flow of an exemplary cooker. A cabinet 1 has surfaces that define a cabinet interior 2. The cabinet 1 can be constructed from cut aluminum sheets, die cast aluminum, or other similar materials and has an elongate shape with a horizontal longitudinal dimension. The cabinet interior 2 of the exemplary cooker is divided into two chambers by an insulating baffle 80 extending across the longitudinal dimension of the cabinet. The two chambers include a heating chamber 40 and a cooking chamber 60. In one embodiment of the present invention, the insulating baffle 80 includes a double-walled liquid reservoir for holding a liquid, such as water, liquid smoke, lemon water, or the like. In another embodiment of the present invention, the insulating baffle 80 is removable from the cabinet interior.

The heating chamber 40 is defined by several surfaces including: a back wall surface 41, a front wall surface 42, a lower surface 43, and a side wall surface 45; and a side surface 82 of insulating baffle 80. An air intake 50 is defined by an opening in one of the cabinet 1 surfaces defining the heating chamber 40. Preferably, the air inlet 50 is located within the lower portion of the heating chamber 40. Furthermore, in an exemplary embodiment, the air intake 50 is located on the lower portion of the side wall surface 45; however, the air intake 50 can also be located on the lower surface 43, or the lower portion of the back wall surface 41 or the front wall surface 42. In one embodiment, best illustrated in FIGS. 2 and 3, an adjustable cover 46 is mounted over the air inlet 50. The adjustable cover 46 can be moved into various positions to restrict or allow air-flow through the air inlet 50.

In the lower portion of the heating compartment 40, a steel flame grate 48 is positioned over a heating element 49. The steel flame grate 48 is positioned substantially parallel to the lower surface 43 or to a tangential line running through the lower surface 43. In an exemplary embodiment of the present invention, the heating element 49 is a propane burner that can be attached to a propane tank or some other source of propane fuel. Other embodiments may use various other heating elements including, but not limited to, natural gas burners, electric heating elements, and charcoal.

As previously described, the heating compartment 40 is separated from the cooking compartment 60 by the insulating baffle 80. Heated air is convected from the heating chamber 40 to the cooking chamber 60 through an air passage 51. In the exemplary embodiment, the air passage 51 is formed by the upper surface 47 of the cabinet 1 and the top of the insulating baffle 80. However, in other embodiments, the air passage may be formed only by the insulating baffle 80, or by a combination of the insulating baffle 80 and other surfaces of the cabinet 1. Thus, the air passage 51 may exist through, above, to the side, or below the insulating baffle 80.

The insulating baffle 80 performs at least two functions. First, the insulating baffle 80 operates to inhibit thermal conductivity from the heating element 49 to the cooking chamber 60. This aspect of the present invention advantageously alleviates the tendency for items in the cooking compartment 60, that are in close proximity to the heating element 49, to cooking at a higher rate than other items.

The cooking chamber 60 is defined by several surfaces of cabinet 1, including: a back wall surface 41, a front wall surface 42, a lower surface 43, and a side wall surface 44; and a side surface 84 of insulating baffle 80. A cooking surface 62 substantially extends the length and the width of the cooking chamber 60, and is substantially parallel with the lower surface 43 of the cooking chamber 60 of cabinet 1. The cooking surface 62 is grated to allow air to pass through the surface. An air outlet 52 is defined in one of the cabinet 1 surfaces defining the cooking chamber 60. Preferably, the air outlet 52 is located in the lower portion of the cooking chamber 60. Furthermore, in an exemplary embodiment, the air outlet 52 is located within the lower portion of the side wall surface 44; however, the air outlet 52 can also be located on the lower portion of the back wall surface 41, the front wall surface 42 or the lower surface 43. In the preferred embodiment, the cooking surface 62 is positioned so that the upper surface of the cooking surface is below the air passage 51 and the lower surface of the cooking surface 62 is above the air outlet 52.

In an exemplary embodiment, a draft chimney 70 is used as a draft generator to pull air through the cabinet interior 2 of the cabinet 1. In one embodiment, the draft chimney 70 includes an elongated flue 71 with a first opening 72 on one end and a second opening 74 on the opposing end. The draft chimney 70 is fixedly attached to the side wall 44 of the cabinet 1 so that the first opening 72 corresponds with the air outlet 52. The elongated flue 71 of the draft chimney 70 vertically extends upward, substantially parallel to the side wall 44. In the preferred embodiment, the length of the elongated flue 71 is about four feet and approximately two feet of the elongated flue 71 extends above the cabinet 1. In an exemplary embodiment, a chimney cap 76 may be attached over the second opening 74 in such a way as to allow air to escape from the second opening 74 but to prevent rain water from entering the second opening 74.

FIG. 6 is a cross-section view of an alternate embodiment of the present invention. In this alternate embodiment, rather than a draft chimney, a motorized fan 77 can be used to create a draft through the cabinet interior 2. In this embodiment, a fan is positioned over the air outlet 52. When the fan is operating, the fan draws air from the cooking chamber 60, thereby creating a draft through the cabinet interior 2. By adjusting the speed of the fan, the rate of air-flow through the cabinet interior 2 can be adjusted.

Figure 7:
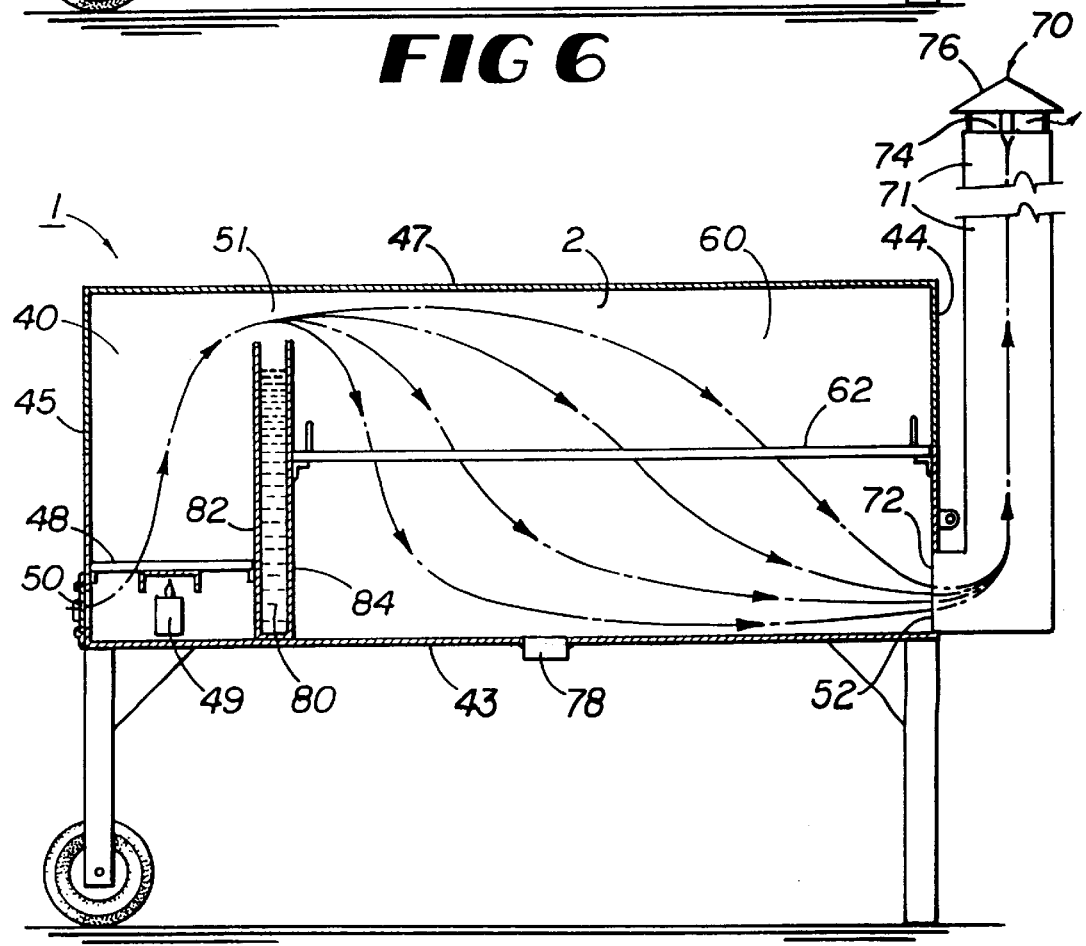
FIG. 7 is a cross-section view of another alternate embodiment of the present invention.

FIG. 7 is a cross-section view of another alternate embodiment of the present invention. In this embodiment, a valve 78 is included in the bottom surface of the cooking chamber 60. In this embodiment, a liquid can be poured into the bottom portion of the cooking chamber 60. During cooking, grease and food particles will fall into the liquid. During clean up, the valve 78 can be opened and the liquid, grease, and food particle mixture can be drained from the cooking chamber 60. This embodiment of the present invention allows for easy clean-up of the cooking chamber 60.

As best seen in FIGS. 2 and 3, the cabinet 1 can be configured to include an upper section 3 and a lower section 4. The upper section 3 and the lower section 4 are attached along a common edge of the back wall surface 41 by a hinging member 12. This configuration allows the upper section 3 to be rotated, along the hinged axis, between an open position as shown in FIG. 2, and a closed position as shown in FIG. 3. In an alternative embodiment, the upper section 3 and the lower section 4 are permanently attached and an access door or panel is provided in the upper section 3.

In an alternative embodiment, the heating chamber 40 and the cooking chamber 60 are vertically aligned with the heating chamber 40 positioned under the cooking chamber 60. In yet another alternative embodiment, the heating chamber 40 can be positioned over the cooking chamber 60. In each of these embodiments, the insulating baffle 80 is positioned between the heating chamber 40 and the cooking chamber 60 and an air passage 51 allows heated air to pass from the heating chamber 40 into the cooking chamber 60.

OPERATION OF THE DISCLOSED EMBODIMENT

In operation, ambient air enters the heating chamber 40 through the air inlet 50. The ambient air is heated by heating element 49. As the air is heated, the air rises through the steel flame grate 48 towards the top of the heating chamber 40. Eventually, the heated air is forced through the air passage 51 and into the cooking chamber 60. As the heated air is forced into the cooking chamber 60, the cooler air previously existing in the cooking chamber 60 is forced down and out the air outlet 52. Eventually, as additional heated air is forced into the cooking chamber 60, some of the heated air is also forced through the air outlet 52, first opening 72, and into the elongated flue 71 of the draft chimney 70. The heated air that is forced into the elongated flue 71 of the draft chimney 70 rises to the top of the elongated flue 71 and exits the elongated flue through the second opening 74. As the heated air rises through the elongated flue 71 of the draft chimney 70, a vacuum, similar to a siphon, is generated to draw additional air through the interior 2 of the cabinet 1. The rate of the air-flow through the interior 2 of the cabinet 1 can be controlled by adjusting the adjustable vent 46 over the air intake 50. In addition, the rate of air-flow can be controlled by adjusting the temperature of the heating element 49.

It should be appreciated that the draft chimney 70 operates to produce a strong draft through the cabinet interior 2. Thus, when the adjustable vent 46 is fully open, a high rate of air-flow can be realized through the cabinet interior 2. This condition allows items on the cooking surface 62 to be cooked quickly. Alternatively, the adjustable vent 46 can be adjusted to a substantially closed position. This condition allows the rate of air-flow to be decreased, thereby allowing items on the cooking surface 62 to be cooked at a slow rate. In the embodiment using a fan to create a draft, the same principle applies. However, varying the speed of the fan can also be used to increase or decrease the rate of air-flow through the cabinet interior 2.

The insulating baffle 80 operates to disperse the air-flow of the heated air throughout the cooking compartment 60. Additional baffles may also be added to further alter the air-flow. This aspect of the invention allows for an even distribution of the heated air throughout the cooking compartment 60. As a result, the items on the cooking surface 62 can be cooked evenly throughout.

In one embodiment, the insulating baffle 80 is a liquid reservoir. In this embodiment, the insulating baffle 80 serves at least two functions. First, the insulating baffle 80 improves the insulation between the heating chamber 40 and the cooking chamber 60. The improved insulation is attributed to the presence of liquid within the reservoir. The improved insulation provided by the insulating baffle 80, prevents items located on the cooking surface 62 in close proximity to the heating element 49 from being burned or over cooked due to thermal conductivity of the heat. Second, the insulating baffle 80 can be used to help season or add moisture to items being cooked on the cooking surface 62. For example, liquid smoke can be added into the reservoir of the insulating baffle 80, allowing the smoke to permeate the items being cooked on the cooking surface 62. As another example, lemon juice and water can be placed into the reservoir of the insulating baffle 80 to provide lemon seasoning to the cooked items. In addition, the steel flame grate 48 can be used to support other flavor enhancing materials. For example, various types of woods, nuts, spices, or the like, can be placed on the steel flame grate 48 over the heating element 49. As these items are heated, the smoke generated from these items provides seasoning to the items being cooked.

As previously mentioned, one embodiment utilizes an insulating baffle 80 that can be detached and removed from the interior 2 of the cabinet 1. This embodiment advantageously allows the insulating baffle 80 to be removed and cleaned between uses.

Although the present invention has been described in various embodiments having various measurements and shapes, it should be understood that the present invention is not limited to any particular shape, size, or configuration. On the contrary, the aspects of the present invention can be embodied in various manners within the scope and spirit of the invention as described herein.

I claim:

1. A method for providing an air-flow of combined heated air and steam in a convection cooking apparatus, the method comprising the steps of:

receiving air through an inlet into a heating chamber;

heating the air within the heating chamber;

heating liquid contents of a hollow baffle located adjacent to the heating chamber;

releasing steam from the hollow baffle into a passage between the heating chamber and a cooking chamber;

drafting the heated air from the heating chamber through the passage into a cooking chamber, thereby combining the heated air with the steam;

passing the combined heated air and steam into the cooking chamber over and though a cooking surface; and venting the combined heated air and steam out of the cooking chamber through an outlet.

2. The method of claim 1, wherein the heating chamber and the cooking chamber are positioned side by side, and said step of drafting the heated air from the heating chamber through the passage into a cooking chamber comprises, drawing the heated air into a first opening of the passage located near the upper portion of the heating chamber, mixing the heated air with the steam within the passage, and venting the combined heated air and steam into the cooking chamber through a second opening of the passage located near the upper portion of the cooking chamber.

* * * * *